A. P. Griffing.
Inkstand.
No. 1,293. Reissued Mar. 25, 1862.
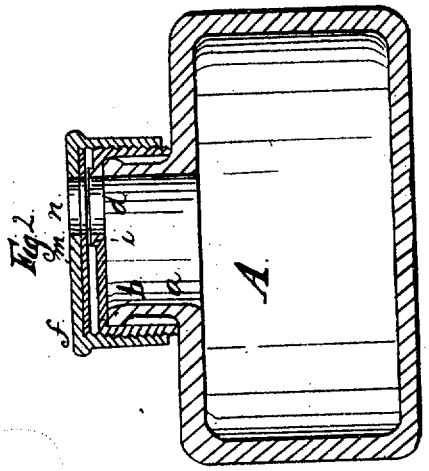
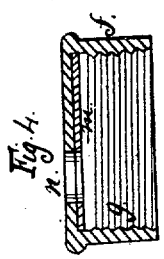
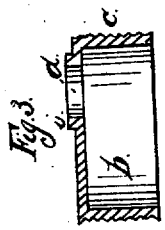
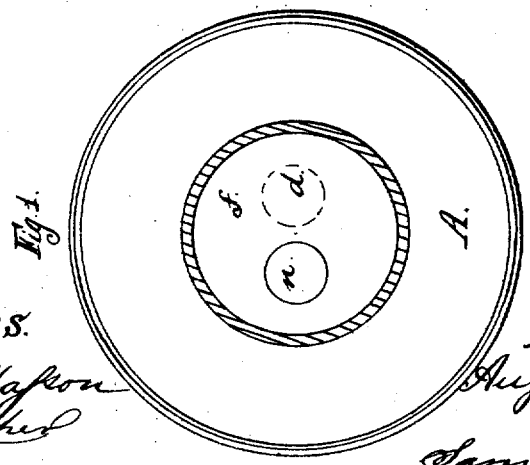
Witnesses.
Edmund Mason
H. Teschemacher
Inventor
Augustus P. Griffing
by his attorney
Samuel Cooper
Pr. Roach

UNITED STATES PATENT OFFICE.

AUGUSTUS P. GRIFFING, OF EAST CAMBRIDGE, MASSACHUSETTS.

INKSTAND.

Specification forming part of Letters Patent No. 34,299, dated February 4, 1862; Reissue No. 1,293, dated March 25, 1862.

*To all whom it may concern:*

Be it known that I, AUGUSTUS P. GRIFFING, of East Cambridge, in the county of Middlesex and State of Massachusetts, have invented an Improved Inkstand, of which the following is a full, clear, and exact description, reference being had to the accompanying drawings, making part of this specification, in which—

Figure 1 is a plan of my inkstand; Fig. 2, a vertical section through the same; Figs. 3 and 4, details to be referred to hereinafter.

The object of my present invention is to produce an inkstand which may be rendered liquid-tight when not in use or when to be carried about, as for a pocket-inkstand, and in which the orifice for the introduction of the pen may be readily opened without the necessity of removing the cap; and my invention consists in an inkstand the cap or cover of which is constructed and operates substantially in the manner of the one which I will now proceed to describe in such terms that others skilled in the art may understand and use my invention.

I am aware that a pocket-inkstand has been made with a cover or cap screwing down onto the mouth of a bottle, but this required the cap to be removed to gain access to the contents, a trouble which I wish to avoid.

I am also aware that an inkstand cap or cover has been made of two plates, each one having a hole in it, so that when the movable plate was turned into one position the holes corresponded and made an opening for the introduction of the pen, but when the plate was turned again the holes would not coincide and the opening would be closed. This answered to exclude dust from a desk-inkstand, but was not sufficiently tight for a pocket-inkstand, as it did not prevent leakage. The large surfaces of the two plates which came in contact were liable to be stuck together by ink which dried upon them.

I am also aware of the United States patent, granted to W. H. Towers, October 2, 1860, No. 30,266, for an inkstand.

In the said drawings, A is the body of the inkstand, to the neck *a* of which is attached by cement or otherwise a cap, *b*. (Shown detached and in section in Fig. 3.) This cap has a screw, *c*, cut on its periphery, and a hole, *d*, (of a proper size to admit a pen,) made in its top eccentric or between the center and the edge of the cap. A rim, *i*, surrounds this hole, being raised a little above the surrounding surface of the cap. Another cap, *f*, (shown detached and in section in Fig. 4,) fits over the cap *b*, a screw, *g*, on the inside of its rim engaging with the screw *c* on the cap *b*. It has a hole, *n*, in its top corresponding in size and position as to distance from the center of the cap with the hole *d* in the cap *b*. A packing, *m*, of leather or other suitable elastic or yielding material, is secured to the inside of the cap *f*, and a hole is cut in this packing to correspond with the hole *n*. The screws are so matched, or the holes cut in reference thereto, that when the cap *f* is screwed down tight the hole *n* will not be over the hole *d*, but at one side of it, as shown in Fig. 1. The packing *m* pressing on the rim *i* around the hole *d* makes a perfectly tight joint, so that the inkstand may be carried in the pocket without danger of leakage, while the small surface of metal—viz, the rim *i*—which is in contact with the packing, prevents the parts from being stuck together by the ink drying on them.

When the inkstand is to be used, the cap *f* is unscrewed a part turn to bring the holes *n* and *d* to coincide. In some cases—as where the inkstand is not to be carried about—the packing *m* may be omitted, the cap *f* screwing down onto the rim *i* of the lower cap; but I prefer to use the packing, as this insures a tight joint and does not strain and wear the screws so much.

What I claim as my invention, and desire to secure by Letters Patent, is—

The inkstand, the caps *b f* of which are made to operate substantially in the manner specified.

AUGUSTUS P. GRIFFING.

Witnesses:

THOS. R. ROACH,

P. E. TESCHEMACHER.